United States Patent [19]

Gaiser

[11] 4,254,624
[45] Mar. 10, 1981

[54] TWO-STAGE MASTER CYLINDER AND VALVE MEMBER THEREFOR

[75] Inventor: Robert F. Gaiser, Stevensville, Mich.

[73] Assignee: The Bendix Corporation, Southfield, Mich.

[21] Appl. No.: 39,020

[22] Filed: May 14, 1979

[51] Int. Cl.³ .............................................. B60T 11/08
[52] U.S. Cl. ........................................ 60/574; 60/591
[58] Field of Search ................ 60/574, 578, 562, 550, 60/591

[56] References Cited

U.S. PATENT DOCUMENTS

| 3,667,229 | 6/1972 | Cresto | 60/578 |
| 4,027,482 | 6/1977 | Manzini | 60/578 |
| 4,086,770 | 5/1978 | Shaw | 60/574 |
| 4,170,386 | 10/1979 | Shutt | 60/562 |

*Primary Examiner*—Abraham Hershkovitz
*Attorney, Agent, or Firm*—Paul D. Schoenle; Ken C. Decker.

[57] ABSTRACT

A two-stage master cylinder includes a housing with a stepped bore for receiving at least one piston. The one piston cooperates with the housing to substantially define a primary chamber communicating with a brake circuit and an auxiliary or fast- fill chamber. The auxiliary chamber is contracted during a braking application to communicate pressurized fluid to the primary chamber. A valve member is exposed to the fluid pressure within the primary chamber and the auxiliary chamber to communicate the latter with a reservoir. The valve member defines a first differential area and a second differential area which cooperate with the primary and auxiliary chambers, respectively, to meter the communication of fluid from the auxiliary chamber to the reservoir as the fluid pressure within the primary chamber is increasing. When the primary chamber is increasing in fluid pressure during a braking application, the fluid pressure within the auxiliary chamber is increasing or decreasing depending on the opening and closing of communication between the auxiliary chamber and the reservoir.

10 Claims, 2 Drawing Figures

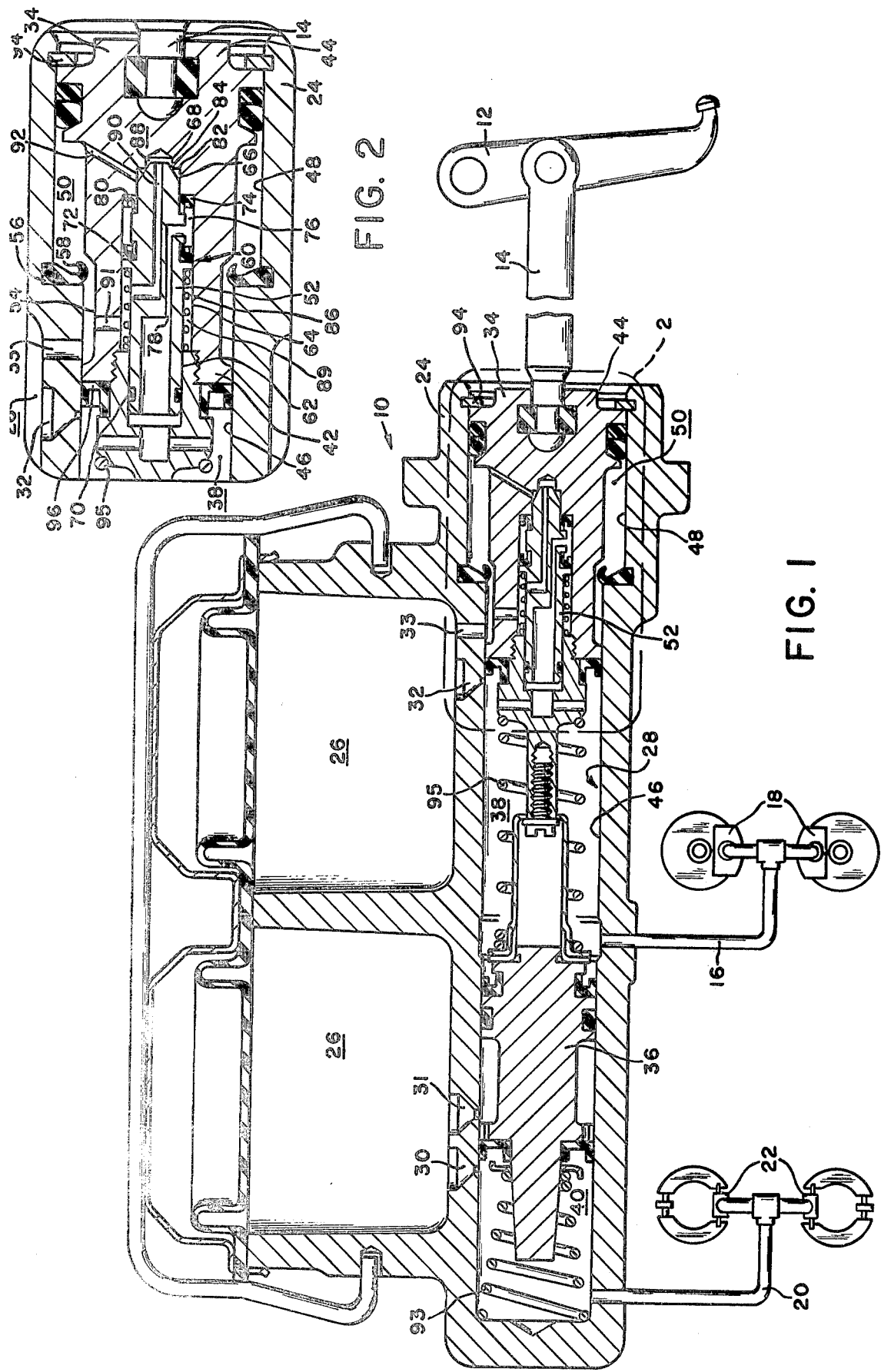

TWO-STAGE MASTER CYLINDER AND VALVE MEMBER THEREFOR

BACKGROUND OF THE INVENTION

A two-stage master cylinder is illustrated in U.S. patent application Ser. No. 832,134, now U.S. Pat. No. 4,170,386. A housing defines a reservoir and a bore which movably receives a pair of pistons. One of the pistons carries a valve member and cooperates with the housing to define a fast-fill chamber. During a braking application, fluid pressure trapped within the fast-fill chamber is communicated to the primary chamber via the valve member. When a predetermined pressure level is reached in the primary chamber, the valve member operates to dump the fast-fill chamber to the reservoir. When the fast-fill chamber is dumped a transition occurs for the effort required to actuate braking. Prior to dumping, pedal effort is utilized to generate fluid pressure in the fast-fill chamber as well as in the primary chamber. After dumping, pedal effort is only required to generate fluid pressure in the primary chamber. Consequently, a decrease in pedal effort is felt by a vehicle operator upon dumping of the fast-fill chamber to the reservoir.

SUMMARY OF THE PRESENT INVENTION

The present invention relates to a two-stage master cylinder which meters the communication of fluid from the fast-fill or auxiliary chamber to the reservoir. In particular, a valve member defines a first differential area exposed to the primary chamber and a second differential area exposed to the auxiliary chamber. During a brake application increasing pressure within the auxiliary chamber acts against the second differential area and increasing pressure within the primary chamber acts against the first differential area to move the valve member to a position opening communication between the auxiliary chamber and the reservoir. As a result the fluid pressure within the auxiliary chamber is decreased to correspondingly decrease the force acting against the second differential area. The valve member is returned by the force of a resilient member to its rest position closing communication between the auxiliary chamber and the reservoir, thereby permitting the remaining fluid within the auxiliary chamber to increase in pressure during braking to again bias the valve member to a position opening the auxiliary chamber to repeat the metering of fluid from the auxiliary chamber to the reservoir. The valve member meters fluid flow when the fluid pressure within the primary chamber is between a first and a second predetermined pressure level. Below the first predetermined pressure level the valve member closes communication between the auxiliary chamber and the reservoir and above the second predetermined pressure level the valve member opens communication between the auxiliary chamber and the reservoir.

The valve member cooperates with a first seal and a second seal to substantially define a center chamber communicating with the primary chamber. The seals are lip seals which face each other and one of the first and second lip seals provides for communication of fluid pressure from the auxiliary chamber to the center chamber. A first passage within the valve member communicates the center chamber to the primary chamber and a second passage within the valve member communicates the auxiliary chamber with the reservoir.

It is a primary object of the present invention to provide a valve member in a two-stage master cylinder which operates to meter fluid flow from a fast-fill or auxiliary chamber to a reservoir when the fluid pressure within a primary chamber is between a first predetermined pressure and a second predetermined pressure.

It is another object of the present invention to substantially eliminate a loss in brake pedal effort in a two-stage master cylinder as the transition from fast-fill chamber pressurization to primary chamber pressurization is taking place.

BRIEF DESCRIPTION OF THE DRAWNGS

FIG. 1 is a schematic illustration of a brake system including a sectional view of a two-stage master cylinder constructed in accordace with the present invention; and FIG. 2 is an enlarged view of the encircled portion of FIG. 1.

DETAILED DESCRIPTION

In the brake system of FIG. 1, a two-stage master cylinder 10 is coupled to a brake pedal 12 via an input rod 14 and an outlet conduit 16 communicates with a brake assembly 18. Another outlet conduit 20 communicates with a brake assembly 22. When the brake pedal 12 is moved by a vehicle operator the master cylinder 10 develops fluid pressure which is communicated to the brake assemblies 18 and 22 to effectuate braking.

The two-stage master cylinder 10 includes a housing 24 which substantially defines a split reservoir 26 and a stepped bore 28. Ports at 30, 31 and 32, 33 provide for communication of fluid from the reservoir 26 to the bore 28. The stepped bore movably receives a first piston 34 and a second piston 36. The first piston cooperates with the housing to substantially define a primary chamber 38 and the second piston 36 cooperates with the housing to substantially define a secondary chamber 40. The primary chamber 38 communicates with the outlet conduit 16 and the secondary chamber 40 communicates with the outlet conduit 20.

In the rest position illustrated in FIG. 1, the first piston 34 includes a first section 42 and a second section 44. The section 42 sealingly engages a small diameter bore portion 46 of stepped bore 28 and the section 44 sealingly engages a large diameter bore portion 48 of stepped bore 28 so as to form a fast-fill or auxiliary chamber 50. In addition, the first piston 34 carries a valve member 52 to control communication of fluid between the reservoir 26, the auxiliary chamber 50 and the primary chamber 38 in a manner herinafter described.

Turning to the enlarged view of FIG. 2, a groove 54 on the piston 34 is aligned with the port 33 and with a seal 56 to provide fluid communication from the reservoir 26 to the auxiliary chamber 50. The seal 56 includes a lip 58 to close fluid communication via groove 54 when the piston 34 is moved to the left. The seal 56 also permits fluid communication from left to right when the pressure to the left of the seal is greater than the pressure to the right of the seal.

The piston 34 includes a cavity 60 with a first diameter section 62, a second diameter section 64, a third diameter section 66 and a fourth diameter section 68. The valve member 52 carries seals 70 and 72 sealingly engaging the first diameter section 62 and the second diameter section 64, respectively. A seal 74 is positioned within the second diameter section facing seal 72 to define a center chamber 76 between seals 72 and 74. The center chamber 76 communicates with the primary chamber 38 via a first passage 78 within the valve member 52. Consequently, the fluid pressure within primary chamber 38 substantially the same as the fluid pressure within the center chamber 76 to maintain seal 74 against a shoulder 80 between diameter sections 64 and 66. Another shoulder 82 between diameter sections 66 and 68 defines a seat 84 against which the valve member 52 is biased by spring 86. The fourth diameter section 68 leads to a pocket 88 and a second passage 90 within the valve member 52 opens to the pocket 88. The passage 90 extends from the pocket 88 to a space 89 wherein the spring 86 is disposed between the valve member 52 and the piston 34. The piston forms a radial passage 91 opening the space 89 to the groove 54. Another passage 92 within the piston 34 extends substantially radially to communicate the auxiliary chamber 50 with the portion of cavity 60 substantially at diameter section 66 between shoulder 80 and seat 84.

The piston 34 is biased by springs 93 and 95 into abutments with a stop 94 to define the rest position. A lip seal 96 is carried by the piston 34 to the right of port 32 so that the primary chamber 38 is in communication with the reservoir 26 when the piston 34 is in the rest position.

MODE OF OPERATION

When a vehicle operator steps on the brake pedal 12 to actuate braking, the input rod 14 is moved to the left to move the piston 34 to the left. The lip seal 96 closes the primary chamber 38 to the reservoir 26 and the piston 34 is sealingly engageable with the lip 58 of seal 56. Continued movement of the piston pressurizes the fluid pressure trapped within primary chamber 38 to bias the piston 36 to move, thereby closing port 30 and pressurizing fluid trapped within chamber 40. Fluid trapped within auxiliary chamber 50 is also pressurized and communicated from auxiliary chamber 50 to primary chamber 38 via passage 92, seal 74, center chamber 76 and passage 78.

The movement of the piston 34 to the left increases the fluid pressure within the primary chamber 38 and the auxiliary chamber 50. The fluid pressure within the primary chamber (and center chamber) acts against a first differential area on the valve member 52 defined by the first diameter section 62 and the second diameter section 64. That is, fluid pressure acting across seal 72 biases the valve member to the left while fluid pressure across seal 70 cooperates with spring 86 to bias the valve member to the right in abutment with seat 84. The fluid pressure within the auxiliary chamber 50 acts against a second differential area on the valve member defined by the third diameter section 66 and the fourth diameter section 68 to bias the valve member to the left away from seat 84.

As the fluid pressure within the primary chamber 38 is increasing up to a first predetermined pressure level, the forces on the valve member are sufficient to maintain the same in abutment with the seat 84. The first predetermined pressure level is dependent on the spring constant of spring 86 and the dimensions of the diameter sections of cavity 60. When the fluid pressure within primary chamber 38 reaches the first predetermined pressure level, the fluid forces on the valve member 52 overcome the spring 86 to slightly move the valve member 52 away from seat 84. As a result a portion of the pressurized fluid within auxiliary chamber 50 is communicated to the reservoir 26 via passage 92, seat 84, pocket 88, passage 90, space 89, passage 91, groove 54 and port 33. The opening of fluid communication between the auxiliary chamber 50 and the reservoir 26 causes a decrease in the level of fluid pressure within the auxiliary chamber 50 so as to reduce the force acting on the valve member causing it to move away from the seat 84. Consequently, the valve member is returned to a position restricting fluid communication past seat 84 to provide for continued pressure buildup in auxiliary chamber 50. This cycle of varying or metering fluid communication past seat 84 is continued until the fluid pressure within the primary chamber 38 reaches a second predetermined pressure level which is dependent on the diameter sections of the cavity 60. At the second predetermined pressure level, the fluid force acting across seal 72 is sufficient to overcome the fluid force across seal 70 plus the force of spring 86 to move the valve member 52 away from the seat 84 to enable the auxiliary chamber 50 to dump to the reservoir 26. As a substantial portion of the auxiliary chamber pressure is metered to the reservoir prior to the dumping of the auxiliary chamber to the reservoir, the transition from moving the piston 34 against the combined fluid pressure within the auxiliary chamber and primary chamber to moving the piston only against the fluid pressure within the primary chamber occurs with minimal change in effort on the input rod 14 and brake pedal 12.

When braking is terminated and the vehicle operator relieves the force applied to pedal 12, the springs 93 and 95 bias the pistons 34 and 36 to return to their rest positions. At the piston 34 returns to the rest position, the auxiliary chamber is expanded so that the fluid pressure on the right side of seal 56 is less than the fluid pressure on the left side. Therefore, during return movement of piston 34, the lip 58 of seal 56 permits communication of fluid from reservoir 26 to auxiliary chamber 50 via port 33, groove 54 and lip 58. The fluid pressure within chamber 38 is decreased with the piston 34 moving to the right so that the spring 86 biases the valve member 52 to move into abutment with the seat 84.

Although the valve member 52 is disposed within the piston 34, it is possible to dispose the valve member within the outlet conduit 16 near the housing 24 in order to meter the flow of fluid from the auxiliary chamber to the reservoir during a braking application. In addition, it is possible to orientate the valve member radially within the piston 34 rather than axially, as shown. Other variations and/or modifications are possible by one skilled in the art and it is intended that these variations and/or modifications be included within the scope of the appended claims.

I claim:

1. In a two-stage master cylinder having at least one piston cooperating with a housing to substantially define a primary chamber and an auxiliary chamber, the housing also defining a reservoir which communicates fluid to the primary chamber and the auxiliary chamber, the one piston being movable within the housing to communicate fluid pressure from the primary chamber to a brake circuit and from the auxiliary chamber to the primary chamber, and a valve member responsive to fluid pressure within the primary chamber to open communication between the auxiliary chamber and the reservoir during a brake application, the improvement wherein said valve member is responsive to fluid pressure in said auxiliary chamber to increase and decrease communication between said auxiliary chamber and said reservoir as said piston is moved within said housing during a brake application, said valve member being movably disposed within said piston, said valve member defining a first diameter exposed to the fluid pressure within said primary chamber so as to bias said valve member to a position closing communication between said auxiliary chamber and said reservoir, and said valve member defining a second diameter exposed to the fluid pressure within said primary chamber so as to bias said valve member to a position opening communication between said auxiliary chamber and said reservoir.

2. The two-stage master cylinder of claim 1 in which said second diameter is larger than said first diameter.

3. In a two-stage master cylinder having at least one piston cooperating with a housing to substantially define a primary chamber and an auxiliary chamber, the housing also defining a reservoir which communicates fluid to the primary chamber and the auxiliary chamber, the one piston being movable within the housing to communicate fluid pressure from the primary chamber to a brake circuit and from the auxiliary chamber to the primary chamber, and a valve member responsive to fluid pressure within the primary chamber to open communication between the auxiliary chamber and the reservoir during a brake application, the improvement wherein said valve member is responsive to fluid pressure in said auxiliary chamber to increase and decrease communication between said auxiliary chamber and said reservoir as said piston is moved within said housing during a brake application, said valve member cooperating with a first seal and a second seal to substantially define a center chamber between the first and second seals, said center chamber communicating with said primary chamber to receive fluid pressure therefrom, the fluid pressure within said center chamber biasing said valve member to a position opening said auxiliary chamber to said reservoir.

4. The two stage master cylinder of claim 3 in which said first and second seals are lip seals which face each other.

5. The two-stage master cylinder of claim 3 in which said valve member defines a first passage communicating said center chamber with said primary chamber and a second passage communicating said reservoir with said auxiliary chamber when said valve member is moved from a rest position.

6. In a two-stage master cylinder having at least one piston cooperating with a housing to substantially define a primary chamber and an auxiliary chamber, the housing also defining a reservoir which communicates fluid to the primary and auxiliary chambers, the one piston being movable within the housing to communicate fluid pressure from the auxiliary chamber to the primary chamber and a valve member cooperating with the reservoir, the auxiliary chamber and the primary chamber to control communication from the auxiliary chamber to the reservoir as the one piston moves within the housing, the improvement wherein said valve member is biased to a rest position closing communication between said auxiliary chamber and said reservoir, said valve member being movable in response to fluid pressure within said primary and auxiliary chambers to open communication between said auxiliary chamber and said reservoir to decrease fluid pressure within said auxiliary chamber, and said valve member being movable in response to the decreasing fluid pressure within said auxiliary chamber to substantially close communication between said auxiliary chamber and said reservoir, said valve member defining a first passage closed to prevent communication between said auxiliary chamber and said reservoir only when said valve member is in the rest position and a second passage partially defined by said valve member and separate from said first passage for communicating said auxiliary chamber with said primary chamber.

7. A two-stage master cylinder comprising a housing substantially defining a reservoir and a bore for movably receiving at least one piston, said one piston cooperating with said bore to substantially define a primary chamber and an auxiliary chamber, said reservoir communicating fluid to said primary and auxiliary chambers, passage means for communicating said auxiliary chamber with said primary chamber and with said reservoir, said one piston being movable within said bore to develop fluid pressure within said primary and auxiliary chambers during a braking application, and a valve member cooperating with said passage means to control fluid communication between said auxiliary chamber and said reservoir, said valve member being movable in response to increasing fluid pressure within said primary and auxiliary chambers to reciprocate between a first position restricting fluid communication between said auxiliary chamber and said reservoir and a second position opening fluid communication between said auxiliary chamber and said reservoir, said valve member being movably disposed within said housing, said valve member cooperating with one of said one piston and said housing to substantially define a center chamber, said valve member including a first passage communicating said center chamber with said primary chamber, and said valve member including a second passage communicating said auxiliary chamber with said reservoir independently of said center chamber.

8. The two-stage master cylinder of claim 7 in which said valve member defines a first and a second differential area exposed to fluid pressure within said primary chamber and a third differential area exposed to fluid pressure within said auxiliary chamber.

9. The two-stage master cylinder of claim 7 in which said valve member is normally biased to a rest position closing communication between said second passage and said auxiliary chamber.

10. A two-stage master cylinder comprising:
   a housing defining a stepped bore therein having small and large diameter bore portions;
   a piston slidably received in said stepped bore and sealingly cooperating with said small and large diameter bore portions to define a primary chamber and an auxiliary chamber, said primary chamber communicating with a brake, means for resiliently biasing said piston to a rest position;
   a fluid reservoir communicating with said primary and auxiliary chambers when said piston is in said rest position, said piston being movable from said rest position responsive to an operator input to close communication between said fluid reservoir and said primary and auxiliary chambers and to communicate pressurized fluid from said auxiliary chamber to said primary chamber and from said primary chamber to said brake, said piston defining passage means communicating said auxiliary chamber with said reservoir;
   pressure responsive valve means for opening and closing said passage means, said valve means defining a first and a second area which are exposed to the pressure in said primary chamber and a third area which is exposed to the pressure in said auxiliary chamber, resilient means for yieldably biasing said valve means to a first position substantially closing said passage means, said first and second areas in combination creating a first force opposing said resilient means responsive to pressure within said primary chamber, said third area creating a second force opposing said resilient means responsive to pressure within said auxiliary chamber; said first and second forces overcoming said resilient means and moving said valve means to a second position opening said passage means responsive to first predetermined pressures in said primary and auxiliary chambers, thereby decreasing the fluid pressure within said auxiliary chamber; said resilient means moving said valve means to said first position responsive to decreasing pressure in said auxiliary chamber, said first force alone moving said valve means to said second position responsive to a second predetermined pressure in said primary chamber which is greater than said first predetermined pressure, whereby said valve means reciprocates between said first and second positions as the pressure within said primary chamber increases from said first predetermined pressure to said second predetermined pressure so as to meter fluid flow from said auxiliary chamber to said reservoir.

* * * * *